Oct. 27, 1942.  W. H. ROSS  2,300,178
NET DRAG AND SPREADER
Filed Oct. 23, 1941  2 Sheets-Sheet 1

Willie H. Ross,
INVENTOR.

BY
Victor J. Evans & Co.
ATTORNEYS

Oct. 27, 1942.   W. H. ROSS   2,300,178
NET DRAG AND SPREADER
Filed Oct. 23, 1941   2 Sheets-Sheet 2
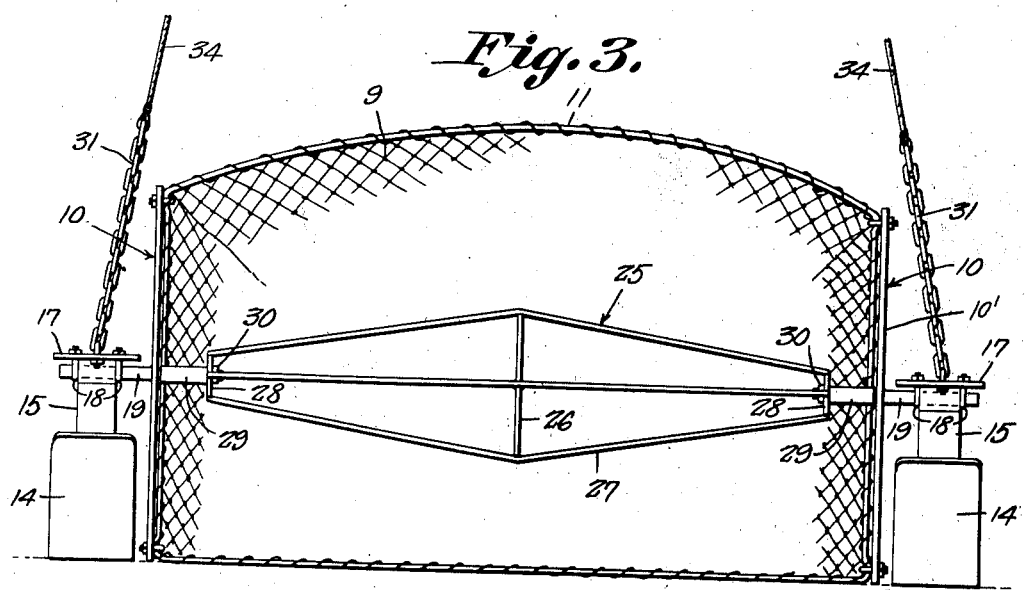
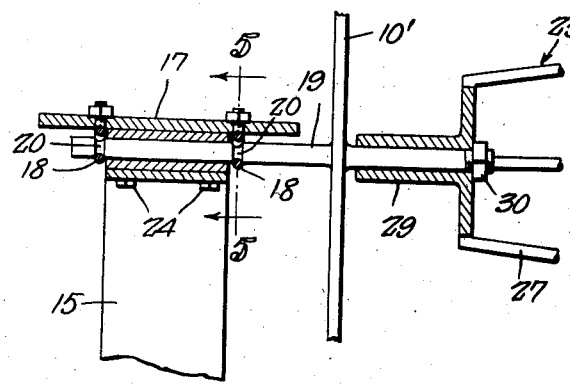
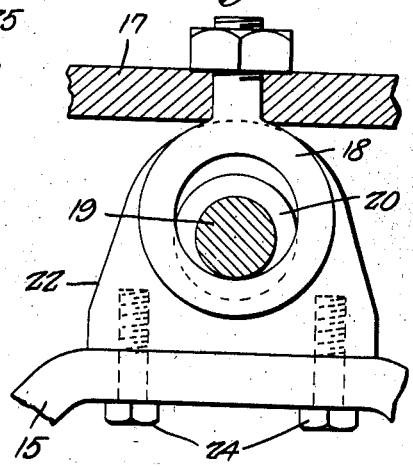
Willie H. Ross,
INVENTOR.
BY
Victor J. Evans & Co.
ATTORNEYS Patented Oct. 27, 1942

2,300,178

UNITED STATES PATENT OFFICE 2,300,178

NET DRAG AND SPREADER

Willie H. Ross, Biloxi, Miss.

Application October 23, 1941, Serial No. 416,250

5 Claims. (Cl. 43—9)

This invention relates to a net drag and spreader and has for an object to provide a device of this character to support a net on either hard or soft bottom bodies of water and hold the net open at the intake end so that the intake end of the net can never sink into a soft bottom or the net become folded with consequent loss of part of the catch.

A further object is to provide a device of this character which will include spaced skids, weighted at the rear ends and turned upwardly at the front ends adapted to be dragged along the bottom and support the mouth of the net.

A further object is to provide a device of this character having spaced vanes above the skids attached to a bridle and adapted to rock downwardly at the front ends should the skids tend to rise at the front ends and hold the skids in proper position on the bottom.

A further object is to provide a device of this character in which the mouth of the net is secured to a substantially rectangular frame which is braced centrally by a transverse brace to maintain the mouth of the net open at all times.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 3 is a front elevation of the net drag and spreader shown in Figure 1 drawn to large scale.

Figure 4 is a detail sectional view showing the pivotal attachment of one of the vanes to a bracket carried by the respective skid and showing the connection of the central spreader to the frame at the open end of the net.

Figure 5 is a detail cross sectional view taken on the line 5—5 of Figure 4.

Figure 1:
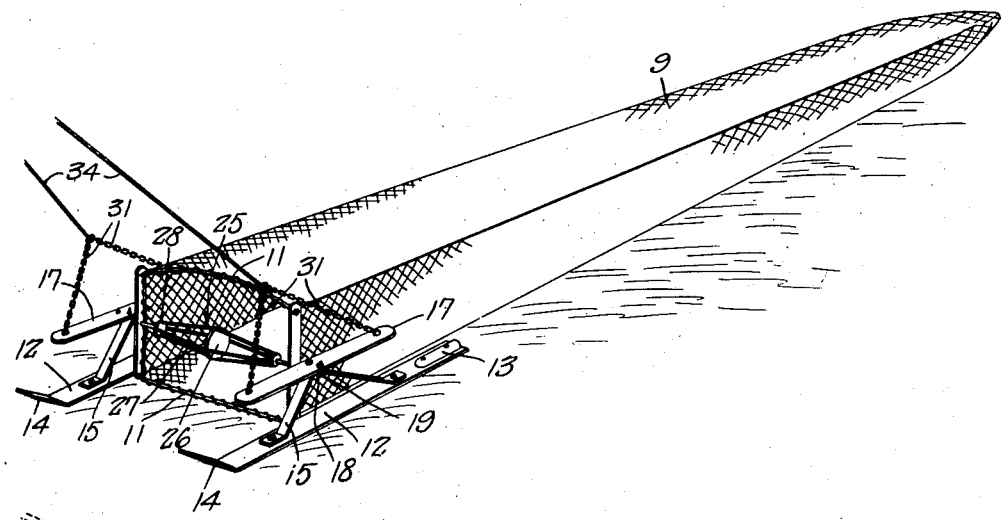
Figure 1 is a perspective view of a net drag and spreader applied to a net for catching shrimp or other small fish, constructed in accordance with the invention.
Figure 2:
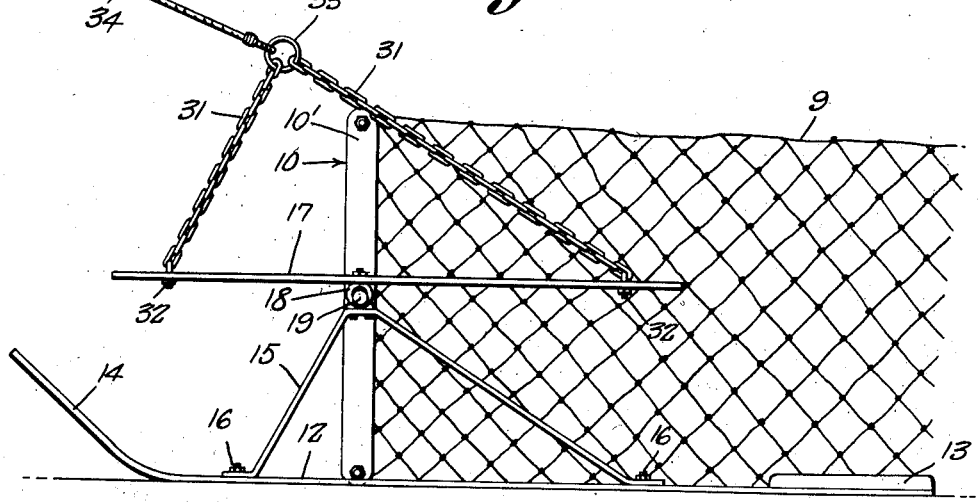
Figure 2 is a detail side elevation, drawn to large scale, showing one of the skids, the respective vane and side of the reinforcing frame for the mouth of the net.

Referring now to the drawings in which like characters of reference designate similar parts in the various views, 9 designates a net suitable for catching shrimp and other small fish close to the bottom of a body of water. In the present embodiment of the invention the mouth of the net is held open and fully stretched at all times through the medium of a supporting frame 10 which includes vertically disposed side bars 10' to which is bolted a substantially rectangular wire hoop 11 to which the mouth of the net is secured. The supporting frame also includes a transverse spreader which will be subsequently described in detail.

For supporting the net on the bottom of the body of water a pair of skids 12 is disposed in spaced relation outside of the net. Each skid is weighted at the rear end through the medium of a weight 13 secured in any preferred manner to the top face of the rear end of the skid. The front end 14 of the skid is turned upwardly at an angle of about forty degrees to the horizontal so that the skids will ride easily over obstructions and cannot dig into a soft bottom. Each skid is provided with a bracket 15 of substantially inverted V-shape, the lower ends of the bracket being bolted as shown at 16 to the skid.

A pair of spaced vanes 17, of less length than the respective skids, are pivotally mounted on the brackets 15 and for this purpose each vane is provided at a point a short distance forward of its transverse median line with a pair of eye bolts 18. The eye of each bolt receives an end portion of a shaft 19 which is provided with a groove 20, see Figure 5, in which the eye of the eye bolt fits, the wall of the groove preventing relative endwise movement of the eye and the shaft. The shaft is journaled in an opening in a bearing block 22 which is bolted as shown at 24 in Figure 4 to the top of the respective bracket 15.

The shaft 19 is extended through the adjacent upright side of the frame 11, see Figures 1 and 4, and is rigidly secured to the frame in any preferred manner.

The spreader referred to above is designated in general by the numeral 25 and is formed of a central disk 26 over which rods 27 are passed and connected at the ends by disks 28. The skeleton spreader thus formed is provided on the outer sides of the end disks 28 with hubs 29, see Figure 4, which receive those ends of the shafts 19 which project through the side bars 10'. Nuts 30 are threaded on the inner ends of the projecting ends of the shafts 19 and bear against the inner faces of the end disks 28 of the spreader to secure the spreader to the projecting ends of the shafts. The function of the spreader is to reinforce the frame 10 at its horizontal median portion without unduly obstructing the open mouth of the net so that shrimp or other small fish may enter the net while the net is being towed along the bottom. Furthermore the spreader 25 acts as a stop for large fish or debris which might otherwise get into the net.

A bridle formed of a pair of chains 31, is secured to the front and rear end portions of the vanes 17 by eye bolts 32. The chains converge upwardly and are connected to respective rings 33 to which lead cables 34 of a tow rope are secured.

In operation the skids ride on the bottom of the body of water and should the front ends tend to rise when striking obstructions the pull of the tow rope on the bridles will elevate the rear ends of the vanes and lower the front ends of the vanes so that pressure of water against the vanes will hold down the front ends of the skids so that the open mouth of the net will always remain on the bottom. When the loaded net is being elevated into the fishing boat the pull of the tow rope will reverse the inclination of the vanes from that above described so that the rear ends of the vanes will extend along the rear legs of the brackets 15 and be reinforced by the brackets against being damaged so that a fully loaded net may be safely lifted to the fishing boat without loss of its contents.

From the above description it is thought that the construction and operation of the invention will be fully understood without further explanation.

What is claimed is:

1. The combination with a fishing net of a frame permanently spreading open the mouth of the net, a pair of skids on either side of the frame having upturned front ends and having weighted rear ends, brackets rising from the skids, shafts having their ends mounted in bearing openings at the upper ends of the brackets permitting of the skids pivoting on the shafts, said shafts being secured to the sides of the first named frame, vanes pivoted on the shafts above respective skids adapted to incline downwardly and forwardly when the front ends of the skids rise and hold the skids on the bottom of a body of water, bridles secured to the front and rear ends of the vanes, and tow means secured to the bridle for dragging the net along the bottom of the body of water.

2. The structure as of claim 1 and in which there is added thereto a brace member disposed at the transverse median line of the frame adapted to reinforce the frame and prevent large fish and debris entering the net.

3. The structure as of claim 1 and in which the front ends of the skids are turned upwardly at an angle of about forty degrees to the horizontal.

4. The structure as of claim 1 and in which the rear ends of the skids are weighted through the medium of weights bolted to upper faces of the skids at the rear ends thereof.

5. The structure as of claim 1 and in which said brackets are of inverted V-shape, the legs of the brackets being secured at the bottom to a respective skid and the upper ends of the brackets being located at about the center of the sides of the frame.

WILLIE H. ROSS.